(12) United States Patent
Terwilleger

(10) Patent No.: US 6,401,655 B1
(45) Date of Patent: Jun. 11, 2002

(54) MILKING CLAW WITH CONCAVE WINDOW

(75) Inventor: Arthur R. Terwilleger, Plattsburg, MO (US)

(73) Assignee: DeLaval Inc., Kansas City, MO (US)

(*) Notice: Subject to any disclaimer, the term of this patent is extended or adjusted under 35 U.S.C. 154(b) by 0 days.

(21) Appl. No.: 09/546,983

(22) Filed: Apr. 13, 2000

(51) Int. Cl.$^7$ ................................. A01J 5/00; A01J 3/00
(52) U.S. Cl. .................................. 119/14.54; 119/14.16
(58) Field of Search ........................... 119/14.16, 14.18, 119/14.37, 14.5, 14.54

(56) References Cited

U.S. PATENT DOCUMENTS

| | | | |
|---|---|---|---|
| 1,348,401 A | | 8/1920 | Frimand |
| 1,396,987 A | | 11/1921 | Bodeker |
| 1,482,848 A | * | 2/1924 | Johnson .................... 119/14.16 |
| 2,466,841 A | * | 4/1949 | Eades ....................... 119/14.16 |
| 2,513,627 A | * | 7/1950 | Dinesen .................... 119/14.16 |
| 2,514,676 A | * | 7/1950 | Shurts ....................... 119/14.16 |
| 2,694,380 A | | 11/1954 | Harstick |
| 2,697,944 A | * | 12/1954 | Wenham ................... 119/14.16 |
| 3,233,589 A | | 2/1966 | Karnath |
| 3,512,504 A | | 5/1970 | Marley |
| 3,776,196 A | | 12/1973 | Luiz |
| 4,253,419 A | | 3/1981 | Yang |
| 4,314,526 A | | 2/1982 | Nordenskjold |
| 4,403,568 A | | 9/1983 | Fukuhara et al. |
| 4,516,592 A | | 5/1985 | Schultz et al. |
| 4,537,152 A | | 8/1985 | Thompson |
| 4,807,566 A | | 2/1989 | Chowdhury |
| 4,957,065 A | | 9/1990 | Neff et al. |
| 5,076,211 A | | 12/1991 | Tonelli |
| 5,080,041 A | | 1/1992 | Steingraber |
| D324,591 S | | 3/1992 | Lallerstedt |
| D327,552 S | | 6/1992 | Lallerstedt |
| 5,291,853 A | | 3/1994 | Steingraber et al. |
| 5,345,390 A | | 9/1994 | Petersson et al. |

(List continued on next page.)

FOREIGN PATENT DOCUMENTS

| | | |
|---|---|---|
| AU | 105472 | 10/1938 |
| AU | 229063 | 6/1960 |
| AU | 238486 | 5/1962 |
| DE | 171749 | 11/1921 |
| DE | 552476 | 4/1943 |
| DE | 3140543 | 4/1983 |
| DE | 71624 | 11/1992 |
| GB | 868294 | 5/1961 |
| GB | 992771 | 5/1965 |
| GB | 2044066 | 10/1980 |
| GB | 2057845 | 4/1981 |
| SU | 1175402 | 8/1985 |
| WO | WO 8500270 | 7/1984 |

OTHER PUBLICATIONS

Bramley, A.J.; Dodd, F.H.; Mein, G.A.; and Bramley, J.A., Editors; *Machine Milking and Lactation*, published by Insight Books, 1992, pp. 164–170 and 188–189.
Alfa Laval Agri, *Equipment & Supplies*, 1997, pp. 28–29.
Colburn Barrel Claw, about 1991.
Alfa Laval Claw, about 1991, manufactured by Boudreau.

*Primary Examiner*—Charles T. Jordan
*Assistant Examiner*—Elizabeth Shaw
(74) *Attorney, Agent, or Firm*—Hovey Williams LLP

(57) ABSTRACT

A milking claw having a barrel-type body and a pair of windows for enclosing a chamber therebetween includes a seal which prevents engagement between the windows and the body. The seal is preferably a rubber seal molded to the perimeter of the window. The seal includes a bead for receipt within an annular groove of the body, and a flange extending longitudinally therefrom. The window preferably includes a concave outer surface which is recessed relative to the longitudinally outwardly facing margin of the body. The outer surface of the window also preferably includes a relieved area centered thereon, permitting enhanced gripping of the claw. The relieved area may be provided by either a raised area molded into the window or a depression in the window.

30 Claims, 1 Drawing Sheet

U.S. PATENT DOCUMENTS

| | | |
|---|---|---|
| D372,566 S | 8/1996 | Chowdhury |
| D384,445 S | 9/1997 | Chowdhury |
| 5,855,183 A * | 1/1999 | Flocchini ............... 119/14.54 |
| 5,988,105 A | 11/1999 | Sandgren |
| 6,006,695 A | 12/1999 | Gustafsson |
| D418,951 S | 1/2000 | Gustafsson |
| 6,055,930 A | 5/2000 | Stein et al. |
| 6,058,880 A | 5/2000 | Gustafsson et al. |

* cited by examiner

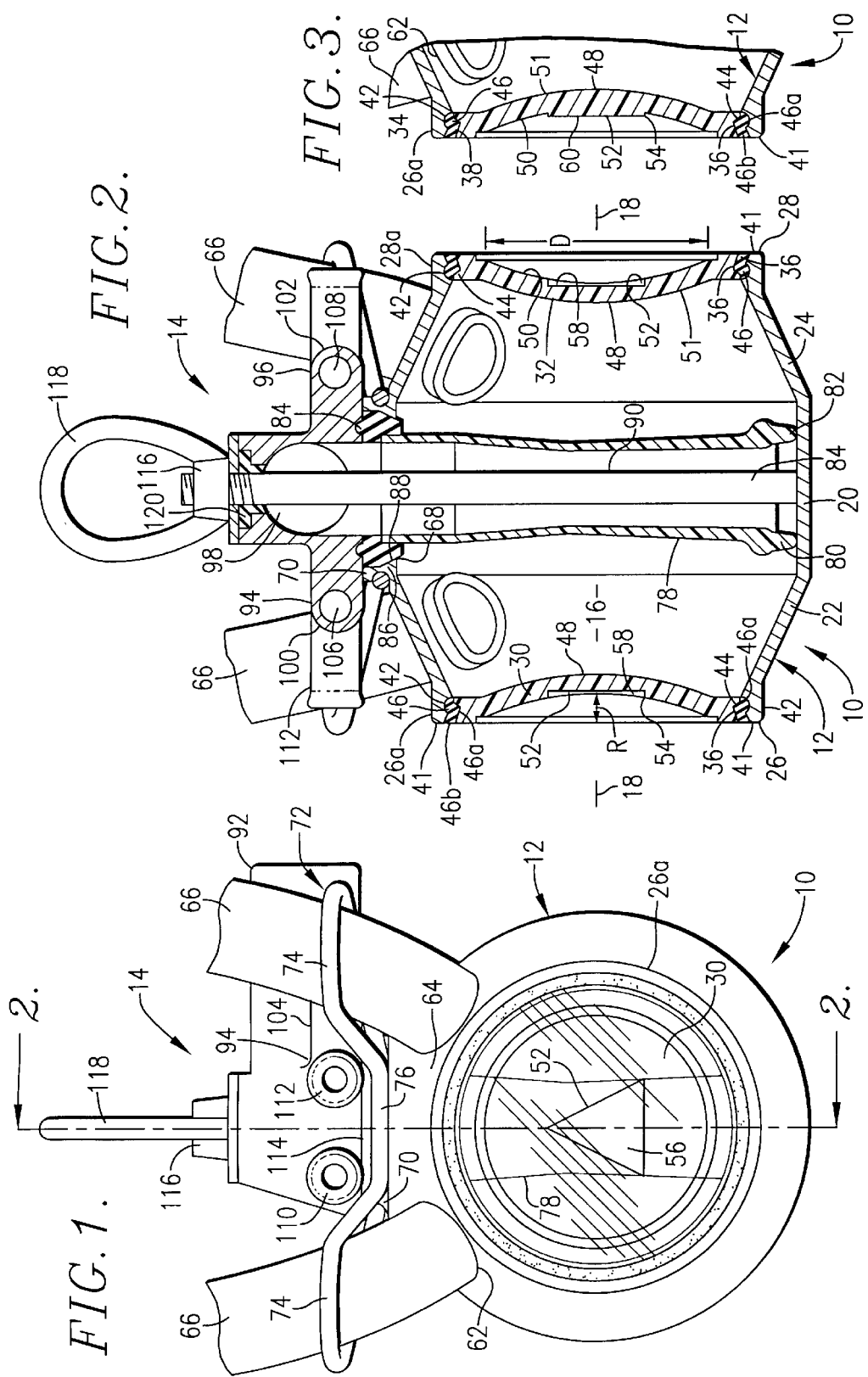

MILKING CLAW WITH CONCAVE WINDOW

BACKGROUND OF THE INVENTION

1. Field of the Invention

The present invention broadly concerns barrel-type milking claws of the type having a window to permit visual inspection of the interior of the claw, and more particularly to a milking claw having a concave window. In addition, the invention concerns a barrel-type milking claw having a window which is provided with a relief section, either raised or indented, to facilitate gripping by a user.

2. Description of the Prior Art

In a milking parlor for dairy animals, such as goats or cows, automated milking is typically accomplished by teat cups which are attached to the teats of the animal and then lead to a milking claw. The milking claw thus collects the milk obtained from the animal and delivers it downstream to a weighing device, flow meter, and/or bulk milk tank. Typically, by the periodic and alternate application of vacuum and atmospheric pressure to the teat cup, the milk is extracted from the udder and delivered to the milking claw. One type of milking claw which has long been used, and is preferred by many dairymen, is known as a barrel-type claw.

The barrel-type claw is typically provided with a cylindrical central body which is of sturdy construction, such as stainless steel which may be readily cleaned, a plurality of nipples fluidically connecting the teat cups to the body, a spout for discharging milk to a milking hose for delivery downstream, and windows which are sealingly attached to each end of the body to permit viewing of the interior of the claw. Barrel claws have enjoyed popularity because they are sturdy and not easily damaged, and fit comfortably into the hand of the operator. However, notwithstanding the foregoing general advantages, the windows of prior art barrel claws are broken due to impact, such as by the hoof of a cow or by dropping on the hard parlor floor, and the when held, milk, water, or other material deposited on the surface of the claw may cause the grip on the claw to slip. In addition, the introduction of warm milk from the udder or a hot water cleaning solution into a relatively cold milking claw where the window is of a different material (e.g. glass or more typically plastic) than the body may cause thermal stresses on the sealing relationship between the window and the body.

SUMMARY OF THE INVENTION

The milking claw of the present invention has been designed with these concerns in mind. While retaining the advantages of a barrel claw configuration, the milking claw hereof provides enhanced protection of the windows of the claw and improved gripping by the user. In addition, by providing a window of a concave configuration, not only is the protection of the window enhanced, but the ability of the window to avoid stress concentration around the perimeter during thermal expansion avoided. Additionally, the barrel claw of the present invention benefits from the provision of a gasket which substantially completely surrounds the window, thereby providing improved sealing and cushioning both for impact but also for thermal expansion.

In this regard, the milking claw of the present invention retains the benefit of the generally barrel-shaped body, which may include not only a cylindrical body but also a body with tapered end portions to improve volumetric capacity in the center but retain the ergonomic benefits of smaller conical end portions, but additionally includes windows presenting a concave outer surface so that the surface remains recessed relative to the longitudinally outer margins of the body. The concave surface of the window is thereby protected from impact, and further provides increased flexibility over flat surfaces. This in turn permits the window to flex and absorb stress caused by occasions where thermal expansion of the body will be different than the window. Instead of concentrating the stress around the perimeter occasioned by a flat window surface, the arcuate surface of the window permits the window to more readily flex and enables the window to distribute the stress more fully throughout the window.

The window may be provided with a relief in its surface, such as by a raised area or an indented area. Such a raised or indented area provides improved gripping for the dairyman, without detracting from the overall ability to view through the window. By providing an relief in the window, the dairyman may grasp the generally arcuate claw but have improved gripping on the surface by having an edge or the like on the otherwise smooth surface and gives a purchase to prevent slippage from the dairyman's hand.

These and other important objects will be made clear from the description and claims which follow:

BRIEF DESCRIPTION OF THE DRAWINGS

FIG. 1 is an end elevational view of the milking claw hereof, showing the window having a concave surface and an indented relief area held by a surrounding gasket in the body of the claw;

FIG. 2 is a vertical sectional view taken along line 2—2 of FIG. 1, showing the concave configuration of the windows at each end, the gasket positioned between all of the perimeter surface of the window and the body of the claw, and an indented relief surface centered on the outer face of the window; and FIG. 3 is a fragmentary vertical sectional view similar to FIG. 2 of an alternate embodiment of the window of the milking claw hereof, wherein the window has a raised relief surface centered therein.

DESCRIPTION OF THE PREFERRED EMBODIMENT

The milking claw 10 of the present invention comprises two primary parts, namely a generally barrel-shaped body 12 and a combination vacuum distribution manifold and discharge spout unit 14. The body 12 is tubular and hollow to present an internal, milk-receiving chamber 16 and is somewhat elongated so as to present a longitudinal axis 18 as shown in FIG. 2. The body 12 includes a central cylindrical-shaped portion 20 and a pair of opposite, tapered end portions 22 and 24 that are each formed in the shape of a truncated cone, although the body may also have the conventional cylindrical shape throughout as shown in U.S. Pat. No. D 384,445, the disclosure of which is incorporated herein by reference. Opposite ends 26 and 28 of the body 12 are smaller in diameter than the central portion 20 to give the body 12 its overall generally barrel-shaped configuration wherein the end portions 22 and 24 converge toward the respective ends 26 and 28.

Preferably, the body 12 is constructed from stainless steel to provide a sturdy shell for the chamber 16. Alternatively, the body could be molded of a food grade synthetic resin material. A pair of circular observation windows 30 and 32 are provided at the two opposite ends 26 and 28 to permit the dairyman to observe the milk flow within the chamber 16 from the outside of the body.

As illustrated in detail in FIGS. 2 and 3, each end 26 and 28 of the body defines a window-receiving opening and has an annular rim 26a or 28a of constant diameter. Each rim has an interior, annular, beveled surface 34 that progressively decreases in diameter as the central portion 20 of the body is approached. Windows 30 and 32 are disposed within the rim 26 and have their own circumferential perimeter 36 presenting radially outwardly facing beveled edge 38 that is completely received within the beveled surface 34 so that the windows 30 and 32 are securely seated within the rims 26a and 28a. Preferably, a longitudinally outer face 40 of the perimeter 36 is flush with or slightly recessed from the corresponding outermost end margin 41 of the rim 26a or 28a.

The beveled surface 34 is preferably provided with an annular groove 42 opposite the beveled edge 38 of the windows 30 and 32. The windows 30 and 32 include a raised, radially projecting, circumferentially extending lip 44 which is located opposite the groove 42 on the interior side of the perimeter 36 in facing relationship to the chamber 16. A resilient, annular seal 46, which is somewhat L-shaped in section as seen in FIGS. 2 and 3 includes a bead 46a configured to be received in the groove 42 and a flange 46b extending longitudinally outwardly to cushion and thermally insulate the windows 30, 32 from the body 12. The seal 46 is preferably of natural or synthetic rubber colored white for detection of contaminants thereon, and is positioned between the beveled surface 34 and the beveled edge 38 to not only seat within the groove 42 of the windows 30 and 32, but also to extend longitudinally between the lip 46 and the outer face 40 of the perimeter 36. Preferably, the windows 30 and 32 are molded of a synthetic resin material, although glass could be used at an expense of weight and cost of production. Most preferably, the windows 30 and 32 are of molded of clear polysulfone plastic P 1700-BU281. White silicone or santoprene FDA compliant rubber having a durometer index of 60 to 80 may be used as the seal 46 and molded onto the beveled edge 38 of the windows 30 and 32. Upon the application of sufficient manual pressure, the windows 30 and 32 may be popped out of their seat for cleaning purposes and readily replaced.

Each window 30 and 32 is concave on its outer surface 50 and convex on its interior surface 51, having a center 48 which is longitudinally recessed relative to the outer face 40 and thus recessed relative to the outermost end margin 51 of the body 12. The concavity is preferably such that the outer surface 50 at the center 48 is recessed from the outer face 40 a distance R which is between about ⅓ and ¹⁄₁₀th of the diameter D of the concave outer surface 50 of the windows, and most preferably about ⅙th. The center 48 is preferably provided with a relieved area 52 molded therein which provides a gripping edge 54 in the center 48 of the window. As used herein, a relieved area means a portion of the outer surface 50 of the window interior to the perimeter having a different thickness than the surrounding portions of the window. The relieved area 52 may be molded or cut in a familiar shape 56 or logo and preferably centered on the window. As shown in FIG. 2, the relieved area 52 may be provided as a depression or indentation 58 so that the relieved area 52 is of a slightly reduced thickness relative to the surrounding portion of the window. Alternatively, as shown in FIG. 3, the relieved area 52 may be provided as a raised portion 60 wherein the thickness of the window at the relieved area 52 is greater than the surrounding portion of the window. While the size of the relieved area 52 may be varied as desired, it is preferably about ½ to ⅙ in either height, width or diameter of the diameter D.

The body 12 is provided with four inlet openings 62 therein oriented at approximately 30° to 40° and more preferably about 37° from the vertical axis when viewed along a longitudinal axis as seen in FIG. 1, and extend preferably at right angles to the top wall section 64 of the body 12 through which they extend. The openings 62 also extend at right angles to the inclined wall of each conical portion 22, 24 as viewed in a longitudinal vertical plane in FIGS. 2 and 4. Each of the inlet openings 62 are sized to receive the short milk tube of a teat cup liner 66, the latter having an enlarged annular flange located in the chamber 16 to facilitate sealing or undesired decoupling of the liner 66 from the claw 10. The teat cup liners 66 project generally upwardly and outwardly in an advantageous manner when the teat cups (not shown) associated with the liners 66 are secured to the teats of a cow's udder.

The top wall section 64 has a centrally located hole 68. An upstanding, annular boss 70 circumscribes the hole 58 in radially spaced relation thereto. Around the outside of the boss 70 is disposed a wire formed retainer 72 having four petal-like loops 74 projecting radially outwardly from the axis of the hole 68, and a central, generally circular hub portion 76 that embraces and grips the boss 70. The teat cup liner 66 from each opening 62 projects upwardly through and beyond the corresponding loop 74 of the retainer 72, such loops 74 not only serving to confine and control the liners 66 but also to effectively shut them off by a crimping action at the completion of the milking operation when the cups have dropped from the teats and the liners 66 have been draped over and are hanging downwardly from the loops 74.

The hole 68 in the top wall section of the claw body 12 receives an upstanding extraction tube 78 similar to that shown in U.S. Pat. No. 5,076,211, the disclosure of which is incorporated herein by reference. The extraction tube has a lowermost intake end 80 situated near the interior surface of the bottom wall of the central cylindrical portion 20 of the claw body 12, but spaced slightly upwardly therefrom by a plurality of feet 82. The upper end of the extraction tube 78 is substantially circular in cross-section and extends slightly through the hole 68 as shown in FIG. 2, and is held in position by seal 84. The hole 68 has a chamfered surface 86 which is complemental with an outer conical surface 88 on the seal 84. The body has an internal, upstanding bolt 90 extending from and welded to the interior surface of the central portion 20 of the body 12 so that it extends upwardly through the extraction tube 78 and seal 84.

The manifold and discharge spout unit 14 includes a spout 92 and a pair of vacuum manifolds 94 and 96 integrally joined to the spout 92 on opposite sides of the latter. The manifolds 94 and 96 are structurally secured to and integrated with the exterior of the spout 92 but are not in communication with passage 98 of the spout 92 or the extraction tube 78. The right-angle passage 98 does communicate with the extraction tube 78, whereby the end of the spout 92 may be received by and inserted into the end of a flexible main discharge line known as a long milk tube which leads to a downstream delivery site for the milk such as a weigh meter, flow meter, and/or milk collection tank. The discharge line and thus the spout 92 also communicates a vacuum or suction pressure from the downstream delivery site to the interior of the collecting chamber 16 and thence to the teats of the cow's udder via the liners 66.

The function of the manifolds 94 and 96 is to distribute pulsating negative and positive or atmospheric pressure to pulsation chambers of the teat cups so as to alternatively squeeze and relax the liners during the milking action. As shown in FIGS. 1 and 2, each manifold 94, 96 includes its own inlet port 100, 102 in the nature of a tubular fitting 104 that is adapted to receive a corresponding hose leading to a pulsator or other source of pulsating pressure. Each inlet port 100 includes its own internal bore 106, 108 that is axially aligned with the respective port 100, 102. The bores 106, 108 do not communicate with one another within the manifold 94, 96. Correspondingly, each manifold has its own pair of vacuum ports to its corresponding pair of teat cups, i.e., the manifold 94 has a pair of vacuum ports 110, 112 communicating with the bore 106, while the manifold 96 has a corresponding pair of vacuum ports communicating with the bore 108.

The manifold and discharge spout unit 14 includes a depending collar 114 configured for coupling to the body 12. The boss 70 on top wall section of the body 12 and the collar 114 are preferably castellated to present a plurality of complementally configured vertically extending tabs and slots. The adjacent tabs and slots interfit and are positioned to permit the manifold 14 to be positioned with the spout 92 may be oriented at any one of four alternate positions relative to the body 12. Thus, when the collar 114 is interfitted to the boss 70, the spout 92 may extend toward either end 26 or 28 or toward either side of the body 12. The manifold and discharge spout unit 14 is held in sealing relationship to the body 12 by a threaded nut 116 having a loop 118 extending therefrom for hanging the claw 12 from a support when not attached to the animal or otherwise actively in use. The nut 116 is threadably received on the bolt 90, and a seal 120 is provided for preventing a loss of vacuum within the chamber 16. By loosening the nut 116, the manifold and discharge spout unit 14 can be raised sufficiently to disengage the tabs and slots so that the unit 14 can be rotated about the axis of the bolt 90 to a different location. Tightening of the nut 116 onto the bolt 90 after such orientation once again secures the unit 40 in its proper seated position. The foregoing description of the interfitting relationship of the unit 14 to the body 12 as well as an alternate, quarter-turn locking configuration whereby the boss and the collar are provided with quarter-turn, intermeshing threads, is shown in my co-pending U.S. application Ser. No. 09/287, 992, the disclosure of which is incorporated herein by reference. Because of the use of the castellated collar and boss or the quarter turn nature of the threads, the spout and manifold unit 14 can be secured to the body with the spout 92 in any one of four radially projecting positions, i.e., transverse to the longitudinal axis of the barrel claw in either of two positions (one of which is shown herein), or parallel to the axis 18 projecting in either of two opposite directions. In this manner, the dairyman can readily orient the spout 92 and the viewing windows 30, 32 in the best manner to suit the particular style of milking parlor involved.

In use, the windows 30 and 32 are press-fitted into the openings in the body 12 provided by the rims 26a, 28a such that they present a concave exterior surface. Advantageously, by molding the seal 64 onto the windows 30, 32, the fitting of the windows and their associated seals may be accomplished in a single step, and there is a reduced opportunity for debris to become lodged between the seal and its window to affect sealing properties. If the window is relatively warm as compared to the body 12, the resilient seal helps to compensate for thermal expansion. The teat cup liners 66 are connected to the claw 10 is oriented with its longitudinal axis 18 extending in a generally horizontal plane. The extraction tube 78 is inserted downwardly into and through the hole 68 in the top wall section 64 and around the bolt 90, and then the combination spout and manifold unit 14 is secured in place. As earlier mentioned, the radial position of the spout 92 relative to the axis 18 can be varied to best suit the conditions at hand and the style of the milking parlor involved. There are four sets tabs and slots on the boss 70 and the collar 114. Thus, the unit 14 can be attached to the claw in four different radial positions. Pulsation lines, liners and manifold vacuum supply hoses as well as the discharge or long milk tube are attached to the claw as described above, and the teat cups with the teat cup liners are placed on the teats of the animal's udder.

When the system is energized, a vacuum pump associated with the discharge line or long milk tube creates a negative pressure within the chamber 16 which is in turn transmitted to the teat cup liners 64 so that the teat cups are attached by suction to the teats of the animal's udder. Activation of the pulsation system causes alternating positive and negative pressure to be experienced within the manifolds 94 and 96, which in turn impart a pulsating action to the pulsation chambers that surround the teat cup liners 64 within the teat cups. Thus, milk begins to flow from the cow's udder into the chamber 16, whereupon it is drawn up through the extraction tube 78 via the intake end 80 and into the discharge line for delivery to a downstream collection device.

From the foregoing, it may be appreciated that the claw body 12 may be relatively cold when the milk enters the chamber 16. Due to differences in the rates of thermal expansion of the stainless steel body 12 and the windows 30, 32, the body 12 may impart stress to the windows in a radially inward direction. The claw 10 accommodates this stress by the provision of the seal 46 which fully separates and isolates the perimeter 36 of the window from the body. The seal 46 also inhibits leakage of fluid into or out of the claw 10. Additional compensation is provided by the concavity of the window, which permits the stress caused by thermal expansion to be distributed across the window rather than concentrated at the perimeter 36.

The concavity of the outer surface of the windows 30, 32 also help to protect the window from impact. That is to say, impact is less likely because the rims of the body are positioned longitudinally outwardly of the majority of the window, and thus contact by a hoof, the floor, or a tool is more likely to impact the rim than the window. Moreover, the virtue of the barrel claw in its comfortable design for holding by the dairyman is not only maintained, but enhanced. The provision of a relieved area 52 in the center 48 of the window make gripping and holding of the claw 10 easier than in conventional designs, and helps to inhibit slippage from the hand of the dairyman.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. In a barrel-type milking claw having a body presenting a longitudinal axis and a chamber, and having a first end defining an opening therein, a first window mounted in said first end, the improvement comprising a concave, longitudinally extending outer surface on said first window.

2. A milking claw as set forth in claim 1, wherein said first end includes a substantially circular rim with an interior annular surface, and wherein said first window includes a substantially circular perimeter.

3. A milking claw as set forth in claim 2, wherein said perimeter of said first window includes a radially outwardly facing edge.

4. A milking claw as set forth in claim 3, wherein said perimeter of said first window includes an outer face oriented away from said chamber and received within said rim.

5. A milking claw as set forth in claim 4, wherein said radially outwardly facing edge is beveled to decrease in diameter from said outer face toward said chamber.

6. A milking claw as set forth in claim 5, including an annular lip facing said chamber and extending radially outwardly from said edge.

7. A milking claw as set forth in claim 6, including a seal positioned in radially surrounding relationship to said perimeter and sized, positioned and configured to overlie said edge and prevent engagement between said window and said body.

8. A milking claw as set forth in claim 7, wherein said body includes a beveled surface having an annular groove, said seal including a bead received in said groove and facing said lip and a flange extending between said beveled surface and said edge.

9. A milking claw as set forth in claim 1, wherein said window has a convex interior surface.

10. A milking claw as set forth in claim 1, wherein said window has a relieved area on the outer surface thereof.

11. A milking claw as set forth in claim 10, wherein said relieved area is a depression in the outer surface of the window.

12. A milking claw as set forth in claim 10, wherein said relieved area is a raised area on the outer surface of the window.

13. A milking claw as set forth in claim 1, wherein said body has a second end opposite said first end and defining an opening therein, and including a second window mounted in said second end.

14. A milking claw as set forth in claim 13, wherein said second window has a concave outer surface.

15. In a barrel-type milking claw having a body presenting a longitudinal axis, a chamber, and having a first end defining an opening therein, and a first window mounted in said first end, said first window having a longitudinally outer surface, the improvement comprising a relieved area in the longitudinally outer surface of said first window.

16. A milking claw as set forth in claim 15, wherein said relieved area is a raised area on the outer surface of the window.

17. A milking claw as set forth in claim 15, wherein said relieved area is a depression in the outer surface of the window.

18. A milking claw as set forth in claim 15, wherein said first window includes a surrounding perimeter and said relieved area is substantially centered within the perimeter.

19. A milking claw as set forth in claim 18, wherein said perimeter is arcuate.

20. A milking claw as set forth in claim 18, wherein the outer surface interior of said perimeter and outwardly of said relieved area is substantially concave.

21. A milking claw as set forth in claim 15, wherein said body includes a second end defining an opening and opposite said first end, and including a second window mounted in said second end.

22. A milking claw as set forth in claim 21, wherein said second window has a longitudinally outer surface having a relieved area.

23. A milking claw comprising:

a tubular body presenting a longitudinal axis and having first and second ends, at least one of said ends having a rim with an radially inwardly facing surface and defining an opening therein;

a window received in one of said ends and presenting an radially outwardly facing edge, said window being substantially co-planar with said inwardly facing surface; and a seal located radially outwardly of said window between said radially outwardly facing edge of said window and said radially inwardly facing surface, said seal being substantially sized, positioned and configured to overlie substantially all of said edge and prevent engagement between said edge and said surface.

24. A milking claw as set forth in claim 23, wherein said rim has an annular groove, and wherein said seal includes a bead received in said groove.

25. A milking claw as set forth in claim 24, wherein said seal includes a flange extending longitudinally from said bead and positioned intermediate said edge and said surface.

26. A milking claw as set forth in claim 23, wherein said edge is beveled and said surface is beveled.

27. A milking claw as set forth in claim 23, wherein said inwardly facing surface is substantially annular and said outwardly facing edge is substantially circular.

28. A milking claw as set forth in claim 23, wherein said window includes a concave, longitudinally extending outer surface.

29. A milking claw as set forth in claim 23, wherein said window includes a relieved surface therein.

30. A milking claw as set forth in claim 23, wherein said seal is a rubber seal molded to said window.

\* \* \* \* \*